United States Patent [11] 3,616,217

[72] Inventors Kiyoshi Watanabe
1-21 4-ban, Okihama, Takasago-cho, Takasago, Hyogo;
Tutomu Tanaka, Katayama, Maiko-cho, Tarumi-ku, Kobe, Hyogo; Tamotu Hirakawa, 574, Befu-cho, Kakogawa, Hyogo; Hiroshi Motoki, 1648-8, Fujii, Akashi, Hyogo, all of Japan
[21] Appl. No. 20,823
[22] Filed Mar. 18, 1970
[45] Patented Oct. 26, 1971
Continuation-in-part of application Ser. No. 731,704, May 24, 1968, now abandoned.

[54] PROCESS FOR PREPARING L-THREONINE
11 Claims, No Drawings
[52] U.S. Cl. .................................................. 195/29, 195/47
[51] Int. Cl. .............................................. C12d 13/00
[50] Field of Search ........................................ 195/29, 47

[56] References Cited
UNITED STATES PATENTS
2,937,122  5/1960  Huang ...................... 195/47
OTHER REFERENCES
Watanabe et al. Chem. Abstracts Vol. 69, 1968 No. 85444.

Primary Examiner—A. Louis Monacell
Assistant Examiner—Gary M. Nath
Attorney—Moonray Kojima ABSTRACT: A process for preparing L-threonine by cultivating an artificial mutant of Escherichia coli (ATCC-21248) which requires methionine and valine or leucine in an aqueous nutrient medium under submerged aerobic condition to accumulate appreciable quantities of L-threonine.

PROCESS FOR PREPARING L-THREONINE

This application is a continuation-in-part of Ser. No. 731,704 filed May 24, 1968 now abandoned.

This invention relates to a method for the production of L-threonine using a specialized mutant strain of *Escherichia coli* (hereinafter called *E. coli*).

In the prior art, L-threonine may be produced by such processes as (1) extraction from protein hydrolyzates, (2) chemical synthesis, and (3) microbial synthesis. The first two methods have not proven satisfactory. For example, the extraction method requires purification, and is complex and expensive. The chemical method produces a host of byproducts and contaminants. On the other hand, considerable attention has been attracted to the microbial method, which has been described in such literature as 1951 J. Biol. Chem 190, 227, which discusses Neurospora; 1961, Appl. Microbiol. 9, 419, which discusses *E. coli*; and Japanese Pat. Publication 38/6590, which discloses various bacteria. These may be produced using a precursor (L-homoserine) addition method, and/or a method using auxotrophic mutants.

In each of these aforementioned microbial processes for producing L-threonine, it has been found that the accumulated quantities of L-threonine in culture broth were small. In addition it was found that pure L-threonine was hard to extract because of the byproduction of amino acids such as L-valine, L-alanine, glycine, L-glutamic acid or L-homoserine unconverted.

H. T. Huang discloses in U.S. Pat. No. 2,937,122 that an auxotrophic mutant of *E. coli* which requires diaminopimelic acid and L-methionine for its growth, accumulates a significant, but not especially high, quantity of L-threonine in the presence of diaminopimelic acid and L-methionine.

Japanese Pat. No. 43/11752 describes an *E. coli* mutant IAM-1940 (freely available from American Type Culture collection, Washington DC as ATCC-21246) requiring methionine for its growth. In contrast to U.S. Pat. No. 2,937,122, diaminopimelic acid is not required for growth of the *E. coli* mutant or production of L-threonine. The strain is capable of accumulating significant quantities of L-threonine, but the product decomposes at a significant rate.

According to the present invention, there is provided a process for the industrial scale production of high-purity L-threonine by cultivating a new auxotrophic mutant of *E. coli*, namely ATCC-21248, under the conditions which are described in detail below.

The new strain of this invention is a double auxotrophic mutant which requires for its growth either (1) L-valine and methionine, or (2) L-leucine and methionine. In contrast to U.S. Pat. No. 2,937,122, diaminopimelic acid is not required for its growth or for production of L-threonine. It is obtained from *E. coli* ATCC-21246 by artificial mutation treatment well known by those skilled in the art. A typical strain which was living was deposited with the American Type Culture Collection, Washington, D.C., where it has been assigned the number ATCC-21248, and is freely available to anyone without applicant's permission.

Advantageously, the new strain yields substantially greater quantities of L-threonine from a carbon source than with previously known strains, and also, just as importantly, concurrently decreases the contaminating amino acids. For example, U.S. Pat. No. 2,937,122 yields about 2-3 g./l. L-threonine, whereas the present invention yields typically, about 10 g./l.

Also, advantageously, the extraction of L-threonine from the culture broth is achieved without difficulty. Moreover, the rate of decomposition of the L-threonine is substantially slower than could be obtained from other processes such as that of the mentioned Japanese Pat. No. 43/11752.

This new mutant ATCC-21248 accumulates large quantities of L-threonine in the presence of from about 20 mg. to about 100 mg. of methionine and from about 20 mg. to about 800 mg. of L-valine or L-leucine, per liter of nutrient medium. The best results are obtainable in the presence of from about 40 mg. to about 80 mg. of methionine and from about 200 mg. to about 800 mg. of L-valine per liter. Advantageously, both L-methionine and D-methionine can be used as the source of methionine, but L-valine or L-loucine cannot be replaced with D-isomer.

The process of the present invention is accomplished by aerated submerged fermentation of *E. coli* ATCC-21248 in nutrient medium. Such nutrient medium usually comprises a carbon source, a source of nitrogen, and a source of metalic ion.

As a carbon source it is possible to use one or more of the monosaccharides, for example, glucose, fructose, or the polyhydric alcohols, for example, glycerine, sorbitol and mannitol. It has been found that fructose or the mixture of fructose and glucose are good carbon sources for the production of L-threonine. Fructose isomerized from glucose serves as a good carbon source. The invert sugars from sucrose or molasses by yeast invertase or mineral acid are utilizable in this invention. When enzymatically inverted molasses are used, an exceedingly high yield of L-threonine is achieved. Suitable amounts of the carbon source range from about 3 to 8 percent by weight of the medium. An organic acid may be used as a part of the carbon source, such as citric acid, fumaric acid, succinic acid, aconitic acid, malonic acid, malic acid, aspartic acid and mixtures thereof.

Suitable nitrogen sources are ammonium salts, such as ammonium sulfate, ammonium chloride, ammonium nitrate and the like. The desired amount of suitable ammonium salts to be added may range from 0.5 to 2.5 percent by weight of the medium. Also, a source of growth-stimulating material can be used, such as distillers soluble, yeast extracts, cornsteep liquor and other substances of this nature. Moreover, mineral salts may be used which contain substantial amounts of phosphorus, potassium and magnesium.

The fermentation is improved by the presence of metallic ions, such as iron or zinc which is usually used in the form of sulfate or chloride. The pH of the nutrient medium must be maintained within the range of 5 to 7. Special attention should be given to preventing the pH from exceeding 7, because the threonine produced tends to decompose rapidly when the pH is above 7. The appropriate pH may be attained by addition of acid or alkali solutions to the nutrient medium. The fermentation may generally be carried out at a temperature of from about 27° C. to about 40° C., and preferably in the range of from 33° to 38° C. The time periods may be from about 35 to about 50 hours. The medium is aerated by the addition of air or oxygen at a rate which is measured by the quantity $Kd \times Pg$ value, which is the oxygen absorption rate. The $Kd \times Pg$ value was measured under various conditions of aeration rate and stirring rate according to the sodium sulfite method. It was found that maximum yields of L-threonine were obtained by aeration and stirring resulting in the $Kd \times Pg$ value of from about $1 \times 10^{16}$ to about $7 \times 10^{16}$ g.-mol $O_2$ per minute per ml., as shown in table IV.

The L-threonine produced can be recovered from the fermentation broth by several methods, for example, by seperating the cells and solid matter by filtration or centrifugation, and adsorption of the amino acid on a strong acidic cation exchange resin such as amberlite IR-120 (Rohm and Haas Co.), elution of the amino acid from the resin with dilute ammonia solution, concentration of the elute in vacuum, decolorization and final concentration to a small volume. Crude crystals of L-threonine are obtained from the solution by alcohol addition. Pure crystals of L-threonine are obtained by recrystallization.

The following examples illustrate the principles of the invention without in any way limiting its scope.

EXAMPLE 1

The fermentation medium contained the following ingredients: sugar of cane molasses inverted by yeast (as glucose)—60 g.; $K_2HPO_4$—0.5 g.; $KH_2PO_4$—0.5 g.; $MgSO_4 \cdot 7H_2O$—0.5 $(NH_4)_2SO_4$—10 g.; $CaCO_3$—10 g.; $Fe_2(SO_4)_3 \cdot nH_2O$—0.01 g.;

0.06 g.; L-valine–0.4 g.; tap water –to make contents up to 1 liter; pH –6,7 (by addition of NaOH or HC1).

Seed culture of *E. coli* ATCC–21248 was inoculated in 20 liters of the fermentation medium placed in a 30-liter volume jar fermenter, which was previously sterilized at 120° C. for 15 minutes. The broth was stirred and aerated at about 36° C. under the condition of KdxPg of $3\times10^{16}$ g.-mol $O_2$ per minute per milliliter. The amount of L-threonine produced was about 10.5 g. per liter, after a period of about 40 hours. Byproduction of amino acid was negligible. L-valine of less than 0.1 g. per liter was the only amino acid detected by paper chromatography.

Although there was a slight tendency to decompose, it was substantially slower than the L-threonine obtainable with the above-mentioned Japanese patent's *E. coli* ATCC–21246. This is important and advantageous in the control of fermentation. Thus, the strain of *E. coli* used in this invention is uniquely advantageous in producing high yields of L-threonine without byproduction of contaminating amino acid and also in producing a slower speed of decomposition of L-threonine.

Ten liters of fermentation broth was filtered. The filtrate was passed through a column which was filled with 2.5 liters of Amberlite IR–120. After washing with water, the product was eluted with 3 percent ammonium solution. The eluted L-threonine solution was condensed in vacuum. After decolorization of the condensate, alcohol was added to the solution. 74 g. of crude L-threonine crystals were obtained. These crystals were found to be of more than 93 percent purity of L-threonine.

EXAMPLE II

The procedure of example I was repeated employing, in place of inverted cane molasses, fructose which was isomerized from glucose. After 40 hours, 13 g. per liter of L-threonine was produced in the fermentation medium.

EXAMPLE III

The procedure of example I was repeated employing, in place of inverted can molasses, inverted beet molasses. After 40 hours 11.2 g. per liter of L-threonine was produced in the fermentation medium.

EXAMPLE IV

The procedure of example 1 was repeated employing, in place of the 60 mg. per liter of D, L-methionine, varying amounts of such D,L-methionine, ranging from 0,5,10,20,40,60,80,100,120 and 140 mg. per liter. The amount of L-threonine produced with the different amounts of D,L-methionine are shown below. It can be noted that 20 to 100 mg./1. of methionine produces excellent results. The best results are obtained from use of 40 to 80 mg.1.

Table I

| Added, D,L-methionine, mg./l. | 0 | 5 | 10 | 20 | 40 | 60 | 80 | 100 | 120 | 140 |
|---|---|---|---|---|---|---|---|---|---|---|
| Produced: L-threonine, g/l. | 0 | 2.1 | 4.0 | 4.5 | 7.3 | 8.5 | 7.8 | 4.8 | 1.8 | 1.5 |

EXAMPLE V

The procedure of example I was repeated using instead varying amounts of L-valine. The amount of L-valine used, and the L-threonine which was produced in the fermentation medium is shown below in table II.

Table II

| Added: L-valine, mg/l. | 0 | 10 | 20 | 100 | 200 | 400 | 600 | 800 | 1,000 |
|---|---|---|---|---|---|---|---|---|---|
| Produced: L-threonine, g./l. | 0 | 3.5 | 5.0 | 7.3 | 9.6 | 10.8 | 10.0 | 7.0 | 4.3 |

As can be seen in the foregoing table II, 20 to 800 mg./l. of L-valine produced excellent results. The best results are obtainable from use of 200 to 800 mg./l.

EXAMPLE VI

The procedure of example I was repeated using varying amounts of L-leucine in place of L-valine. L-threonine was produced in the fermentation medium as shown in table III.

Table III

| Added: L-leucine, mg./l. | 0 | 10 | 20 | 100 | 200 | 400 | 600 | 800 | 1,000 |
|---|---|---|---|---|---|---|---|---|---|
| Produced: L-threonine, g./l. | 0 | 3.3 | 5.8 | 6.8 | 7.5 | 8.8 | 8.5 | 6.3 | 3.0 |

As can be seen, 20 to 800 mg./l. of leucine produces excellent results.

EXAMPLE VII

The procedure of example I was repeated using varying amounts and rates of aeration and stirring to obtain varying KdxPg amounts. The KdxPg values are measured in g-mol $O_2$ per minute per milliliter. L-threonine was produced in the fermentation medium as shown in table IV in varying amounts for varying amounts of the KdxPg rates. It can seem that the range of from $1\times10^{16}$ to $7\times10^{16}$ produce excellent results.

Table IV

| KdxPg. $10^{16}$ g.-mol $O_2$/min./ml. | 0.5 | 1.0 | 2.0 | 3.0 | 5.0 | 7.0 | 9.0 | 11.0 |
|---|---|---|---|---|---|---|---|---|
| Produced: L-threonine g./l. | 3.0 | 6.0 | 9.8 | 10.8 | 10 | 7.1 | 4.6 | 2.7 |

Various modifications and extensions of this invention will become apparent to those skilled in the art. All such variations and deviations which, basically, rely on these teachings, through which this invention has advanced the art, are properly considered within the spirit and scope of this invention.

What is claimed is:

1. A process for preparing L-threonine by cultivating *Escherichia coli* ATCC–21248, under submerged aerobic conditions in an aqueous nutrient medium containing one or more of monosaccharides or polyhydric alcohols, 20 to 100 mg. of methionine and from 20 to 800 mg. of L-valine or L-leucine per liter of nutrient medium.

2. The process of claim 1, wherein said monosaccharides or polyhydric alcohols comprises from 3 to 8 percent by weight of said medium.

3. The process of claim 1, wherein said medium comprises a nitrogen source, said nitrogen source ranging from 0.5 to 2.5 percent by weight of said medium.

4. The process of claim 1, wherein said medium comprises a metallic ion.

5. The process of claim 1, wherein said medium is fermented for a period of from about 35 to about 50 hours at a temperature of from about 27° to about 40° C.

6. The process of claim 5, wherein said temperature is from 33° to 38° C.

7. The process of claim 8, wherein said medium is maintained at a pH of from 5 to 7.

8. The process of claim 8, wherein the Kd×Pg (oxygen absorption rate) is maintained under submerged aerobic conditions at from $1 \times 10^{16}$ to $7 \times 10^{16}$ g.-mol $O_2$ per minute per milliliter.

9. Process for preparing L-threonine by cultivating under submerged aerobic conditions at a pH of from 5 to 7, of *E. coli* ATCC-21248, in an aqueous nutrient medium comprising one or more monosaccharides or polyhydric alcohols, a source of nitrogen, a source of metallic ions, 20 to 100 mg. of methionine and 20 to 800 mg. of L-valine or L-leucine per liter of said medium, and in which said medium is aerated and stirred to result in a Kd×Pg oxygen absorption rate of from $1 \times 10^{16}$ to $7 \times 10^{16}$ g.-mol $O_2$ per minute per milliliter.

10. Process of claim 9, wherein aid methionine is from 40 to 80 mg. per liter of said medium.

11. Process of claim 9, wherein said L-valine or L-leucine is from 200 to 800 mg. per liter of said medium.